April 12, 1927.
E. ENDERES
1,624,166
AUXILIARY REFLECTOR FOR AUTOMOBILE HEADLIGHTS
Filed Nov. 30, 1925
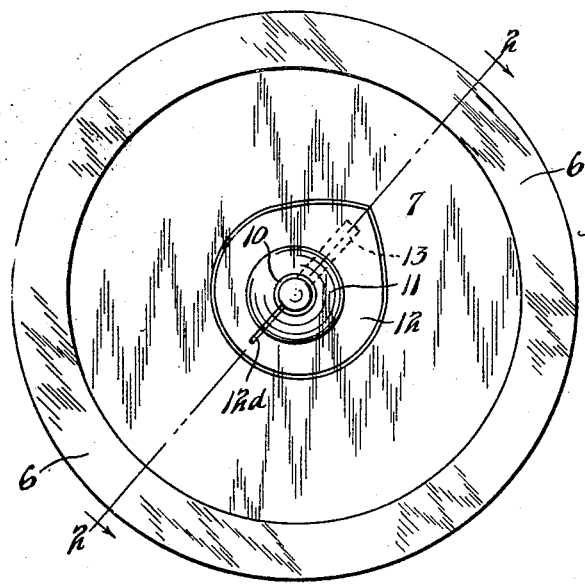
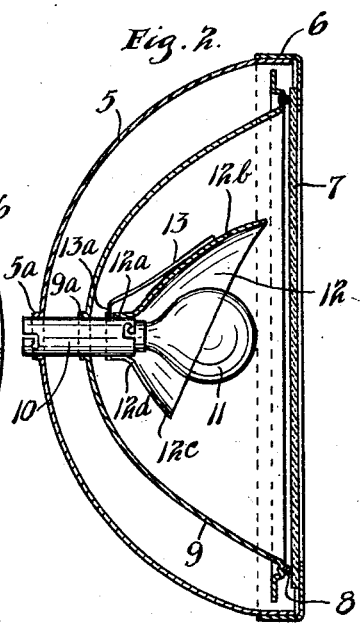
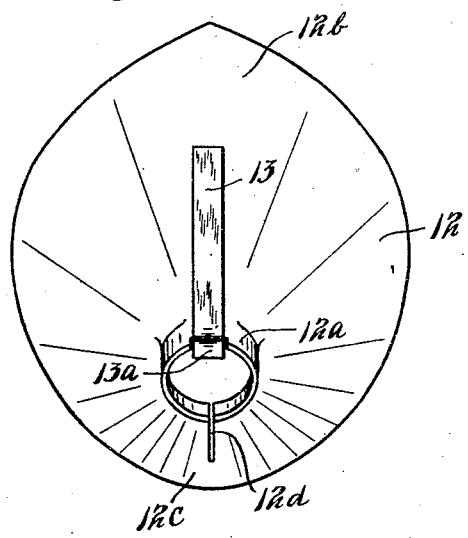
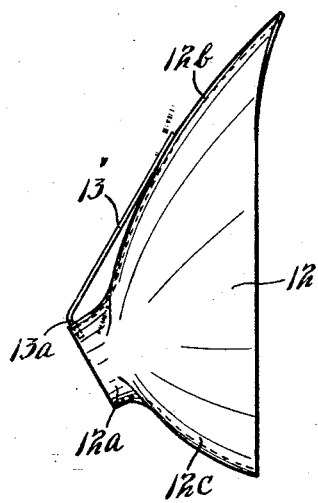
INVENTOR.
ERNEST ENDERES.
BY HIS ATTORNEYS.

Patented Apr. 12, 1927.

1,624,166

UNITED STATES PATENT OFFICE.

ERNST ENDERES, OF ALBERT LEA, MINNESOTA.

AUXILIARY REFLECTOR FOR AUTOMOBILE HEADLIGHTS.

Application filed November 30, 1925. Serial No. 72,196.

This invention relates to an automobile and particularly to an auxiliary reflector for use in an automobile or other vehicle headlight. As is well known to those skilled in the art, reflectors in modern automobile headlights distribute the light forwardly and somewhat downwardly on the road, the light being distributed equally at each side. It is desirable when an automobile turns out to pass another car, to have the light thrown downwardly at the side of the road so that the driver can have the side of the road well illuminated and thus avoid running off the road. At night it is impossible often to see the edge of the road close to the car with the ordinary headlights.

It is an object of this invention, therefore, to provide an auxiliary reflector for an automobile headlight which is so shaped and which can be so adjusted as to properly direct the light at the side of the road.

It is a further object of the invention to provide, as an article of manufacture, an auxiliary reflector for an automobile headlight formed from an integral piece of material and having a sleeve projecting from its rear side adapted to be rotatably mounted on the lamp socket of the headlight.

It is more specifically an object of the invention to provide such an auxiliary reflector as set forth in the preceding paragraph, the said sleeve being split at one side, the split extending a short distance from the sleeve through the reflector and the reflector further having a leaf spring secured at its rear and bent to project slightly across the end of said sleeve, said reflector having a portion at one side of said sleeve formed on a comparatively flat curve and a portion at the other side of the sleeve of less length and formed on a sharper curve.

These and other objects and advantages of the invention will be fully set forth in the following description made in connection with the accompanying drawings in which like reference characters refer to the same parts throughout the different views, and in which, Fig. 1 is a view in front elevation of the headlight;

Fig. 2 is a vertical section taken on the line 2—2 of Fig. 1, as indicated by the arrows;

Fig. 3 is a view in side elevation of the auxiliary reflector used; and

Fig. 4 is a view in rear elevation, as seen from the left of Fig. 3.

Referring to the drawings, an automobile headlight is disclosed having the shell or casing 5 with the front rim 6 thereon which is arranged to hold in place the glass or lens 7. This glass is held against an annular member 8 seated in a groove formed in the main reflector 9 which is disposed within the casing 5. The members 5 and 9 have sleeves 5ª and 9ª, respectively, at their rear central portions through which sleeves extends the lamp socket 10 which is adapted to receive the usual automobile lamp bulb 11.

In accordance with this invention, an auxiliary reflector 12 is provided. While this reflector may be variously made, in the embodiment of the invention, the same is illustrated as being formed from one integral piece of sheet material and the same is preferably of elongated form. A substantially cylindrical sleeve 12ª projects from the rear of the reflector 12 and is of a size to be mounted on the lamp socket 10 and to frictionally engage said lamp socket so that the reflector 12 can be rotated on said socket. The sleeve 12 preferably is split along one side as shown at 12ᵈ and said split is continued through the portion 12ᶜ of the reflector for a short distance. A leaf spring 13 is shown as secured at one end to the rear of the reflector 12 and extends toward the end of sleeve 12ª, the end of said spring being bent, as shown at 13ª to project across the rear end of sleeve 12ª and slightly into the passage therethrough. It will be noted that the reflector 12 is formed with a portion 12ᵇ at one side of sleeve 12ª on a comparatively flat curve, the sides of the reflector meeting in a point. The reflector is formed with its other side 12ᶜ of much shorter length than the length of the portion 12ᵇ and the portion 12ᶜ is formed on a sharper curve or a curve with a smaller radius than is the portion 12ᵇ. Particular attention is called to the fact that the line tangent to the center of the portion 12ᵇ makes an angle of substantially forty five degrees with the axis of the sleeve 12ª and that the line tangent to the center of the portion 12ᶜ makes an angle somewhat larger than forty five degrees with the axis of sleeve 12ᵃ. With said portions so disposed, the reflector 12 casts a good light at the side of the machine about ten feet ahead of the automobile, as shown by tests made on the well known Ford automobile. The effect would be substantially the same with other makes of cars. The portion 12ᶜ has the important function of preventing a shadow at the front of the machine.

In operation, the lamp bulb 11 is temporarily removed and the reflector 12 mounted on the socket 10 with sleeve 12ᵃ frictionally engaging said socket. The end 13ᵃ of the spring 13 is raised so that it presses down on the lamp socket 10, the end of said spring being curved substantially with the same curvature as said socket. The reflector 12 can now be rotated on lamp socket 10 and yet will remain in its adjusted position thereon. The sleeve 12ᵃ being split is somewhat resilient and can tightly engage the lamp socket 10. The reflector 12 preferably is disposed with its longitudinal center line passing through its top point at an angle of substantially forty-five degrees with the vertical axis of the headlight. At this angle, the reflector 12 effectively directs part of the rays from the bulb 11 downwardly at one side of the road close to the front of the automobile, as above stated. The reflector 12 can be readily adjusted on the particular headlight to give the desired effect. The driver can thus clearly see the edge of the road when forced to turn out toward the same and he can thus avoid running off the road or into obstructions at the side thereof. The shape of the reflector 12 has been determined after considerable experiment and the present shape has been found to be very successful and efficient, the device having been tested in actual practice.

From the above description it is seen that applicant has provided a very simple and efficient means for effectively illuminating the side of the road and one which will add greatly to the safety in driving an automobile at night. The device is quite simple, can be easily and inexpensively produced and installed.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in appended claims.

What is claimed is:

1. An article of manufacture comprising an auxiliary reflector for an automobile headlight formed of a single sheet of material, said reflector having an integral cylindrical sleeve projecting from its convex side, said sleeve and reflector being split at one side of said sleeve and for a short distance therefrom, said reflector being elongated and having a comparatively long and flat portion at one side of said sleeve and a shorter more sharply curved portion at the opposite side of said sleeve, and a leaf spring secured at one end to the rear of said reflector and having one end bent to project slightly into said sleeve adapted to engage a lamp socket embraced by said sleeve.

2. An article of manufacture comprising an auxiliary reflector of a single sheet of material, said reflector having an integral cylindrical sleeve projecting from its convex surface, said sleeve and reflector being split at one side of said sleeve and for a short distance therefrom, said reflector being elongated and having a comparatively long and flat portion at one side of said sleeve and a shorter more sharply curved portion at the opposite side of said sleeve, said long portion being disposed upwardly and the plane of the front edge of said reflector extending at an angle to the vertical with its lower portion inclined toward the rear of said headlight.

In testimony whereof I affix my signature.

ERNST ENDERES.